Oct. 11, 1938.　　　　M. ESNARD　　　　2,132,894
WASHER FOR FAUCETS
Filed June 30, 1937
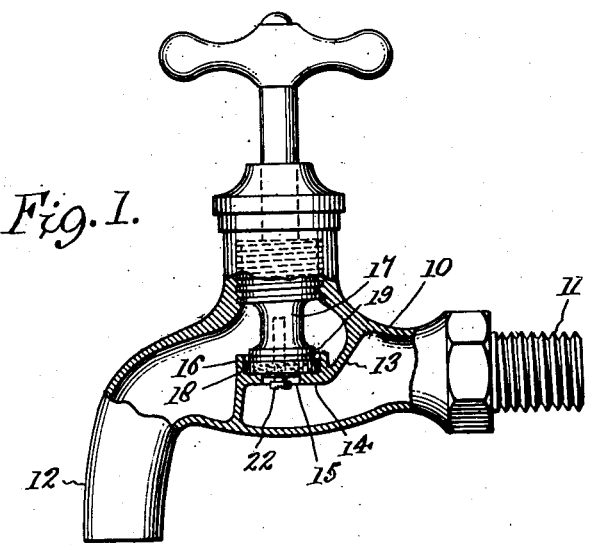
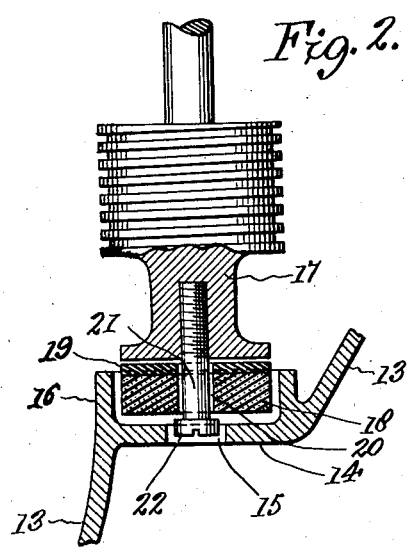
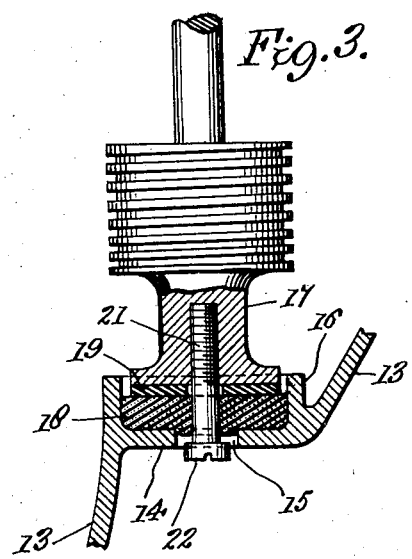
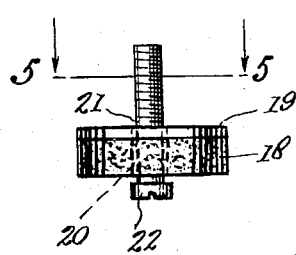
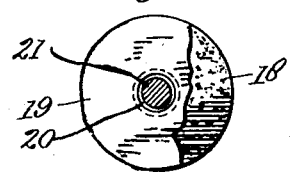
Inventor
M. Esnard
By Wilkinson & Mawhinney
Attorneys.

Patented Oct. 11, 1938

2,132,894

UNITED STATES PATENT OFFICE 2,132,894

WASHER FOR FAUCETS

Miguel Esnard, Matanzas, Cuba, assignor of one-fourth to Shelby Hart Rowlett, Habana, Cuba Application June 30, 1937, Serial No. 151,272

1 Claim. (Cl. 251—46)

The present invention relates to washers for water faucets and the like, and has for an object to provide an improved washer which is adapted for use in faucets of various constructions and applicable to the usual form of quick compression valve bodies.

An object of the invention is to provide a washer of this type which admits of low cost production, which will not chatter under high water pressure, which prevents leakage past the washer when the faucet or valve is closed and cannot readily leak even after considerable wear upon the washer or damage thereto incident to corrosion or pitting of the valve seat.

Another important advantage of the invention is to provide a novel construction of washer which is lubricating and which is carried upon a threaded stem having a sufficient loose fit through the washer to admit of a quantity of the water to pass through the washer about the stem to lubricate the latter, and thus maintain a relatively free and easy movement of the stem in the washer during the turning of the valve body after the washer has engaged and become anchored to the valve seat. This feature of the invention also embodies a construction wherein the expansion of the washer is sufficient to seal it about the valve stem and prevent leakage of water upwardly through the valve when the washer is under compression.

A further object of the invention is to provide an improved washer which is capable of sufficient compression to correct inequalities in the valve seat so as to effect a tight sealing of the washer when under compression, and wherein the body of the washer may be relatively soft to effect the desired conformation thereof to the valve seat under compression, and wherein the upper part of the washer is hardened or provided with a low friction surface portion adapted to turn against the bottom of the valve body.

With the foregoing and other objects in view, the invention will be more fully described hereinafter, and will be more particularly pointed out in the claim appended hereto.

In the drawing, wherein like symbols refer to like or corresponding parts throughout the several views.

Figure 1 is a side elevation, partly in section, of a faucet having the improved washer mounted therein and shown in closed position.

Figure 2 is a fragmentary enlarged sectional view taken through the valve seat with the valve body and the improved washer applied thereto, the valve being shown in open position.

Figure 3 is a similar view showing the valve closed.

Figure 4 is a side elevation of the improved washer with the cooperating novel valve stem extending therethrough, and Figure 5 is a transverse section taken through the same on the line 5—5 of Figure 4, the section taken through the upper part of the valve stem and the upper surface of the washer being partly broken away.

Referring now to the drawing, 10 designates the body portion or shell of a faucet having the usual spud or tail piece 11 for attachment to a supply pipe for receiving water or the like, and is provided with the usual spout 12. The interior of the faucet body 10 is provided with a partition or diaphragm 13 having a substantially horizontal valve seat 14 with a through opening 15 therein for the passage of water through the faucet. In the form of faucet shown the valve seat 14 is provided with an upstanding wall or flange 16 providing a cup with the valve seat 14 as the bottom of the cup and the opening 15 centrally disposed therein.

The faucet body 10 is provided with a valve body 17 threaded at its upper end in the faucet body or shell 10 in the usual manner and which extends downwardly and coaxially with respect to the valve seat 14 and is adapted to be turned to move toward and from the valve seat.

The washer of this invention comprises a circular block 18 of soft rubber or the like which is compressible and which is adapted to fit loosely into the cup or flange 16 and to engage the valve seat 14. The washer 18 is very soft to mold itself to the configuration of the valve seat 14 when placed under compression so that the washer or block 18 is adapted to expand into engagement with the flange or wall 16, as shown in Figures 1 and 3 to completely fill and seal the cup and to also project slightly into the opening 15 for closing the faucet. The soft rubber block 18 is provided with an upper surface portion 19 which is relatively hard and which may be provided by the vulcanization or other treatment of the upper surface portion of the block, or which may comprise a metal disc cemented, vulcanized or otherwise effectively secured to the rubber block 18. This hardened upper surface 19 provides a substantially frictionless bearing to engage the lower end of the valve body 17 so that the latter may turn freely upon the washer without rotating the same after the washer has engaged the valve seat. The washer, after engaging the valve seat, is subjected only to a compression strain and there is but slight tendency to rotation imposed upon the washer after the latter has once frictionally engaged the valve seat.

To hold the washer in place upon the valve body 17, the rubber block 18 and the upper hardened surface 19 are provided with a central opening 20, shown to advantage in Figure 2, and a valve stem 21 is provided which has a head 22 upon its lower end adapted to engage the bottom of the washer to hold it upon the valve stem, and the valve stem has a smooth cylindrical portion adjacent the head 22 for passage through the opening 20 in the washer. The opening 20 is normally, in uncompressed position of the washer, of slightly greater diameter than that of the cylindrical smooth portion of the valve stem 21 so that the washer may freely turn upon the valve stem, even under the initial compression movement of the valve, and also to admit the passage of a small amount of water upwardly about the valve stem 21 for lubricating the same to further increase the turning movement of the washer on the valve stem. The upper end of the stem is threaded for engagement in the usual threaded opening of the valve body 17 so as to hold the washer upon the lower end of the valve body.

In use, the washer is placed over the threaded end of the valve stem and the latter is screwed into the valve body 17. The stem is so proportioned that when fitted in the valve body the washer is relatively loose between the head 22 and the bottom of the valve body, and as the opening 20 is of greater diameter than that of the smooth portion of the valve stem, the washer is free to turn upon the valve stem and a small amount of water may freely pass upwardly about the valve stem to lubricate it and also may pass over the anti-friction surface 19 of the washer to lubricate the same.

When the valve body 17 is turned down toward a closing position, the soft rubber block 18 is first brought into engagement with the valve seat 14 and, by its frictional contact therewith, holds the washer against rotation so that the valve body 17 turns upon the upper hardened surface 19 as the valve body advances toward the valve seat and the washer is compressed and the rubber block portion 18 expands within the flange 16 and also against the cylindrical portion of the valve stem 21. The closed position of the valve or faucet is shown in Figure 3. In this position the body block of rubber 18 of the washer is expanded to seal the opening 15 through the faucet body 10 and is confined from sheeting by the flange or wall 16 and is compressed to some extent into the opening 15 and also into close fitting engagement about the cylindrical portion of the valve stem 21. The washer is thus confined within the cup above the valve seat so that the rubber block 18 will not be unduly distorted and will not be subject to rapid disintegration. It is apparent that the expansion of the rubber block 18 against the valve stem 21 takes effect only during the last stages of compression so that there is but slight tendency for the valve stem to twist or turn within the compressed washer. This action is effected by the relative size of the opening 20 about the valve stem so that the washer portion 18 is left substantially free of twisting or turning strains and may thus conform more readily to any inequalities of the valve seat 14.

As shown in Figure 3 the valve is closed, the opening 15 of the faucet is completely sealed and also the opening 20 through the washer is completely closed so that there is no chance of leakage.

When the faucet is opened, the pressure is relaxed upon the soft rubber block 18 and the latter may thus assume inherent or natural position and is retracted from the valve stem so as to provide the opening 20, when a certain amount of the water in the faucet may freely pass upwardly about the valve stem and across the upper surface of the washer to lubricate the same during the flow of water through the faucet. The smooth and hardened surfaces of the washer, valve stem and valve body 17 are thus kept free of sediment and are sufficiently lubricated to admit of the relative free and easy turning of the valve body 17 and the stem 21 upon and within the washer during the subsequent closing action. These structural features, admitting of this lubrication and reducing the frictional wear on the parts which are brought into relative rotative contact, prolongs the life of the washer and admits of the use of a relatively soft block portion 18 for the washer which insures the effective sealing or closing of the faucet when the flow of water is shut off.

It is obvious that various changes and modifications may be made in the details of construction and design of the above specificially described embodiment of this invention without departing from the spirit thereof, such changes and modifications being restricted only by the scope of the following claim:

What is claimed is:

A closure member for faucets having a valve seat and a valve body mounted for movement toward and from the seat, comprising a soft rubber block with a hardened upper surface for engaging the lower end of the valve body, said block having a central opening therethrough and a valve stem engaging through the opening in the rubber block and having a head on its lower end to engage the lower surface of the block to hold the same on the stem and having an upper threaded end for detachable engagement in the valve body, said stem having a cylindrical portion between the head and the threaded end of greater length than the thickness of the block to admit free turning of the block on the valve stem, the opening through said block being of substantially greater diameter than that of the cylindrical smooth portion of the stem to provide an annular passage through the block between the latter and the stem, said block adapted to be compressed by the valve body against the valve seat for deforming the block to close the opening about the valve stem and seal the latter in the block and for sealing the block against the valve seat.

MIGUEL ESNARD.